(12) United States Patent
Ganesan

(10) Patent No.: US 10,170,209 B2
(45) Date of Patent: Jan. 1, 2019

(54) FLOATING NUCLEAR POWER REACTOR WITH A SELF-COOLING CONTAINMENT STRUCTURE

(71) Applicant: Palvannanathan Ganesan, Omaha, NE (US)

(72) Inventor: Palvannanathan Ganesan, Omaha, NE (US)

( * ) Notice: Subject to any disclaimer, the term of this patent is extended or adjusted under 35 U.S.C. 154(b) by 469 days.

(21) Appl. No.: 15/181,952

(22) Filed: Jun. 14, 2016

(65) Prior Publication Data

US 2016/0314859 A1  Oct. 27, 2016

Related U.S. Application Data

(60) Continuation of application No. 14/109,072, filed on Dec. 17, 2013, now Pat. No. 9,502,143, and a division of application No. 14/109,072, filed on Dec. 17, 2013, now Pat. No. 9,502,143.

(51) Int. Cl.
| | |
|---|---|
| *G21C 15/18* | (2006.01) |
| *G21C 11/04* | (2006.01) |
| *G21C 13/024* | (2006.01) |
| *G21C 17/112* | (2006.01) |
| *G21D 5/02* | (2006.01) |

(52) U.S. Cl.
CPC ............. *G21C 15/18* (2013.01); *G21C 11/04* (2013.01); *G21C 13/024* (2013.01); *G21C 17/112* (2013.01); *G21D 5/02* (2013.01); *G21Y 2002/207* (2013.01); *G21Y 2004/30* (2013.01); *Y02E 30/40* (2013.01)

(58) Field of Classification Search
CPC ...... G21C 15/18; G21C 11/04; G21C 13/024; G21C 17/112; G21D 5/02
USPC ................................................. 376/282, 912
See application file for complete search history.

(56) References Cited

U.S. PATENT DOCUMENTS

| | | |
|---|---|---|
| 3,047,485 A | 7/1962 | Ellis |
| 4,135,468 A | 1/1979 | Kirby et al. |
| 2014/0328445 A1 | 11/2014 | Haratyk |
| 2015/0131769 A1 | 5/2015 | Larrion |

*Primary Examiner* — Jack W Keith
*Assistant Examiner* — Daniel Wasil
(74) *Attorney, Agent, or Firm* — Dennis L. Thomte; Thomte Patent Law Office LLC

(57) ABSTRACT

A floating nuclear power reactor including one or two nuclear power reactors positioned in a floating vessel such as a barge or the like. Means is disclosed for flooding the containment structure of the nuclear reactor and for flooding the reactor vessels to cool the same.

8 Claims, 7 Drawing Sheets

FLOATING NUCLEAR POWER REACTOR WITH A SELF-COOLING CONTAINMENT STRUCTURE

This is a Divisional and Continuation Application of application Ser. No. 14/109,072, filed Dec. 17, 2013, entitled FLOATING NUCLEAR POWER REACTOR WITH A SELF-COOLING CONTAINMENT STRUCTURE.

BACKGROUND OF THE INVENTION

Field of the Invention

This invention relates to a floating nuclear power reactor and more particularly to a floating nuclear power reactor wherein the containment structure of the reactor is self-cooling.

Description of the Related Art

In most nuclear power reactors, a primary electrically operated water pump supplies cooling water to the reactor. In many cases, a secondary or back-up water pump is provided in case the primary water pump becomes inoperative. However, should the electrical power source for the water pump or water pumps be disrupted such as in a tsunami, a typhoon or an earthquake, the water pumps are not able to pump cooling water to the reactor which may result in a dangerous meltdown. Further, in some situations, the pipes supplying cooling water to the reactor may fail due to natural causes or a terrorist attack.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A floating nuclear power reactor is disclosed. In a first embodiment, the nuclear power reactor is mounted or positioned on a floating barge-like vessel with the barge-like vessel having an upper end positioned above the water level of a body of water and a lower end positioned beneath the water level of the body of water. Side walls extend between the lower and upper ends of the vessel. The nuclear power reactor is positioned on the barge-like vessel. The nuclear power reactor includes an upstanding containment structure having a lower end, an upstanding sidewall, and an upper end. The confinement structure defines a sealed interior compartment. The lower end and a lower portion of the side wall of the containment structure is positioned below the water level of the body of water. A reactor vessel is positioned in the interior compartment of the containment structure with the reactor vessel being positioned below the water level of the body of water.

In the first embodiment, a first water passageway, having inner and outer ends, extends through a side wall of the vessel and the side wall of the containment structure with the outer end of the first water passageway and is in fluid communication with the body of water. The inner end of the first water passageway is in fluid communication with the interior compartment of the containment structure. A spring-loaded first hatch is movably mounted on the exterior of the side wall of the vessel at the outer end of the first water passageway. The first hatch is movable between a closed position and an open position. The first hatch, when in its closed position, closes the outer end of the first water passageway. The first hatch, when in its open position, permits water from the body of water to flow inwardly through the first water passageway into the interior compartment of the containment structure to cool the reactor vessel.

A first latching means is associated with the first hatch with the first latching means being movable between a latched position and an unlatched position. The first latching means, when in its latched position, maintains the first hatch in its closed position. The first latching means, when in its unlatched position, permits the first hatch to move from its closed position to its open position. A first condition responsive actuator is associated with the first latching means to move the first latching means from its latched position to its unlatched position upon the condition, either temperature or pressure, in the containment structure reaching a predetermined level.

A second water passageway, having inner and outer ends, extends through one of the sides of the vessel into the interior of the reactor vessel. A second hatch is movably mounted on the side of the vessel at the outer end of the second water passageway. The second hatch is movable between a closed position and an open position. The second hatch closes the outer end of said second passageway when in its closed position. The second hatch, when in its open position, permits water from the body of water to flow inwardly into the interior of the reactor vessel to cool the reactor vessel. A second latching means is associated with the second hatch which is movable from a latched position to an unlatched position. The second latching means, when in its latched position, maintains the second hatch in its closed position. The second latching means, when in its unlatched position, permits the second hatch to move from its closed position to its open position. A condition, either temperature or pressure, responsive actuator is associated with the second latching means to move the second latching means from its latched position to its unlatched position upon the condition within the reactor vessel reaching a predetermined level.

Other ways of flooding the interior compartment of the containment structure and the reactor vessel are described and shown.

The drawings illustrate a pair of nuclear power reactors positioned on the vessel but the vessel could have a single nuclear power reactor mounted thereon.

It is therefore a principal object of the invention to provide an improved floating nuclear power reactor.

A further object of the invention is to provide a floating nuclear power reactor which is self-cooling upon the temperature or pressure reaching a predetermined level in the containment structure or reactor vessel of the nuclear power reactor.

A further object of the invention is to provide a self-cooling nuclear power reactor.

A further object of the invention is to provide a cooling mechanism for a floating nuclear power reactor which does not require electrical power to operate.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
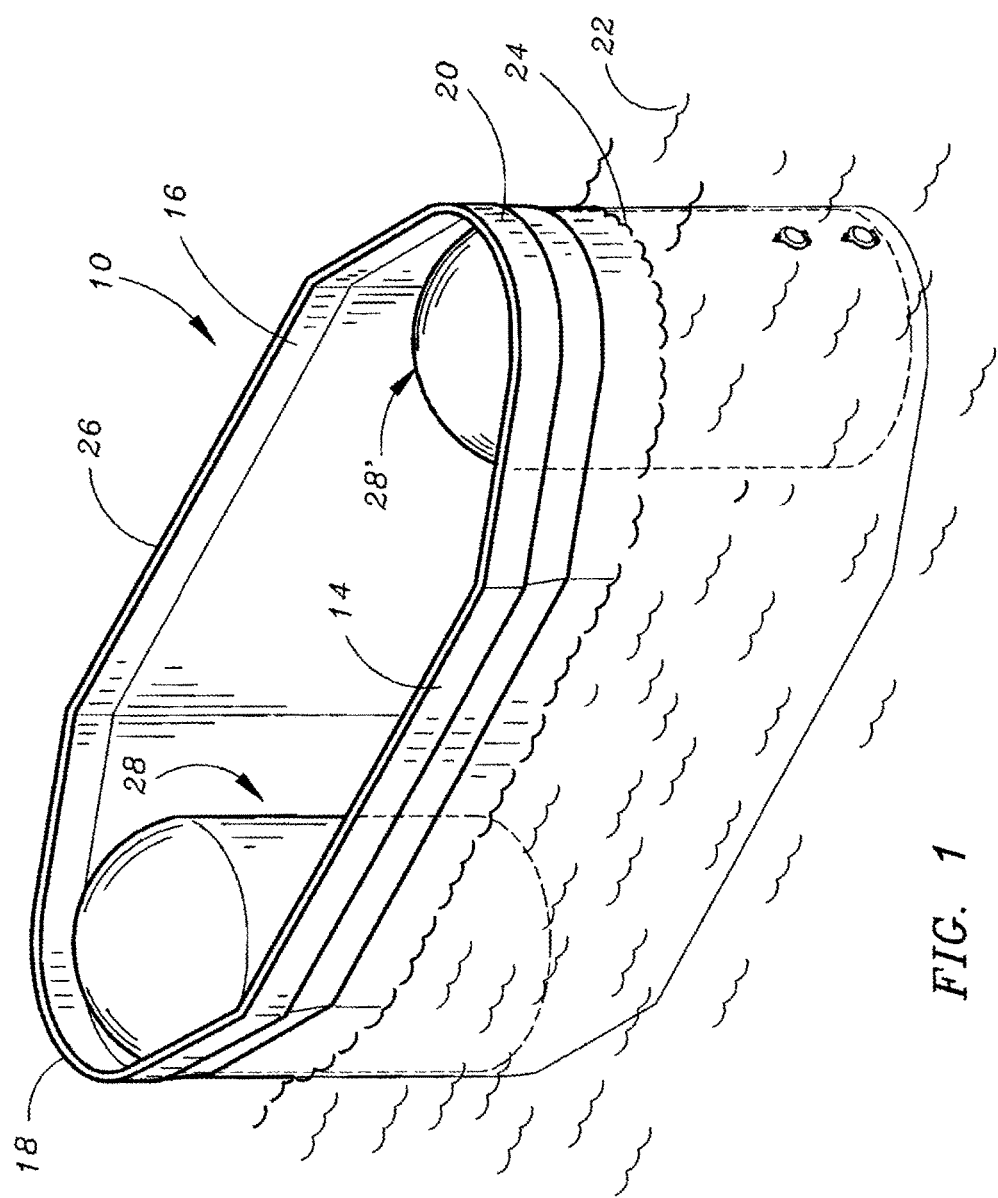
FIG. 1 is a perspective view of a first embodiment of a floating vessel such as a barge which has a pair of spaced-apart nuclear power reactors positioned therein.
Figure 2:
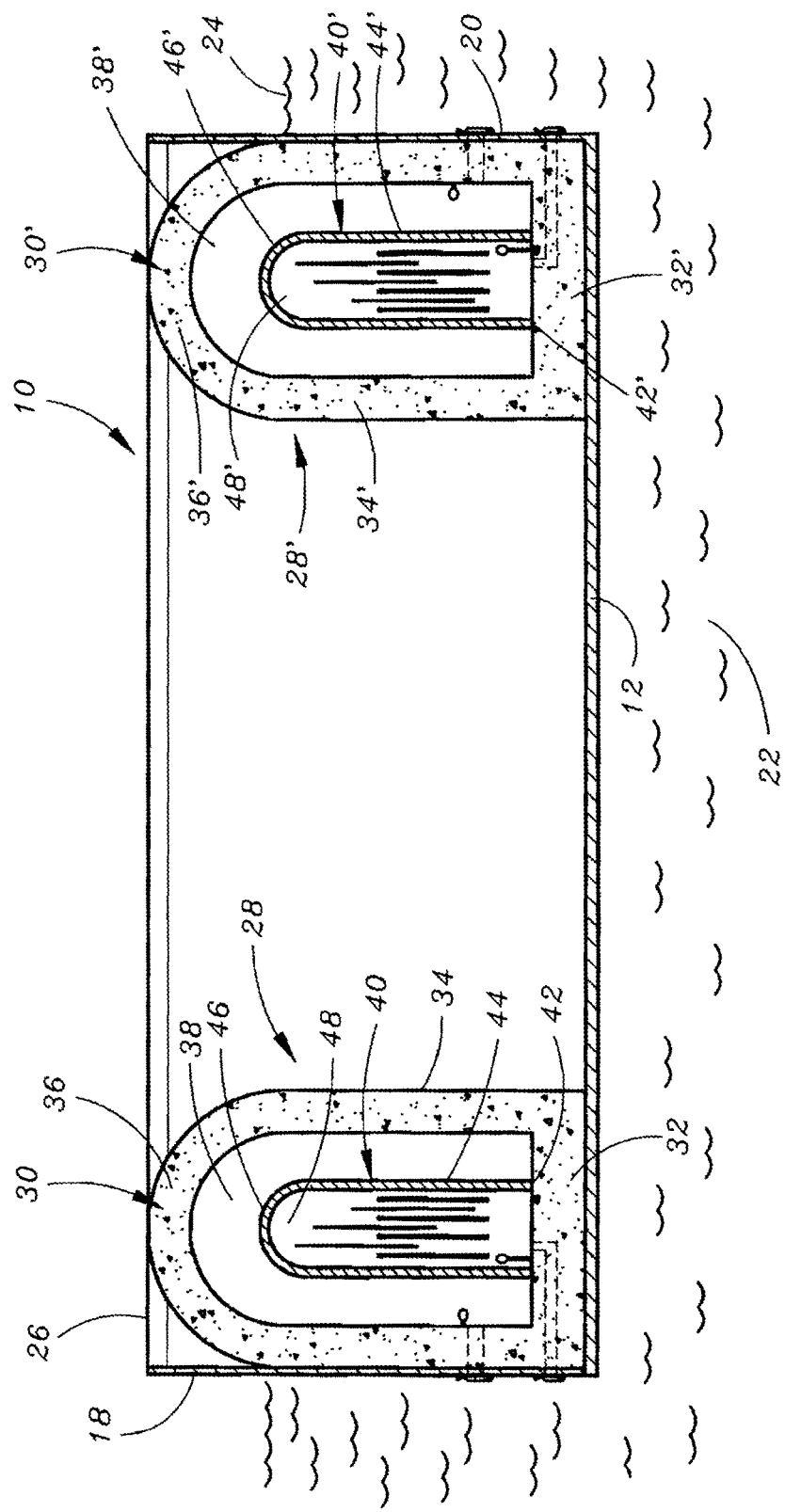
FIG. 2 is a sectional view of the floating vessel of FIG. 1 and the pair of nuclear power reactors positioned therein.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

In a first embodiment of the invention shown in FIGS. 1-5, the numeral 10 refers to a floating vessel such as a barge. Vessel 10 could be a ship hull or other floating structure. Barge 10 includes a bottom 12, upstanding sides 14 and 16, and upstanding ends 18 and 20. Barge 10 may be constructed of any suitable material such as steel, concrete, etc. Barge 10 is shown as floating in a body of water 22 such as a lake, ocean, etc. For reference purposes, the body of water 22 will be described as having a water level 24. As seen, the upper end 26 of barge 10 is positioned above the water level 24 with a majority of the barge 10 being submerged in the body of water 22.

In the first embodiment, a pair of nuclear power reactors 28 and 28' are shown generally in the drawings. Although two reactors are shown in the drawings, a single reactor may be positioned in the barge 10. Since the reactors 28 and 28' are identical, only reactor 28 will be described in detail with an identical structure on reactor 28 being identified with "'". Reactor 28 includes an upstanding containment structure 30 constructed of concrete and which includes a bottom 32, an upstanding side wall 34, and an upper end 36 which defines a sealed interior compartment 38. A reactor vessel 40 is positioned in compartment 38 and includes an open bottom 42, side wall 44 and upper end 46 which define a sealed interior compartment 48. As seen, the bottom 42 of reactor vessel 40 is positioned on the upper end of bottom 32 of containment structure 30.

Figure 3:
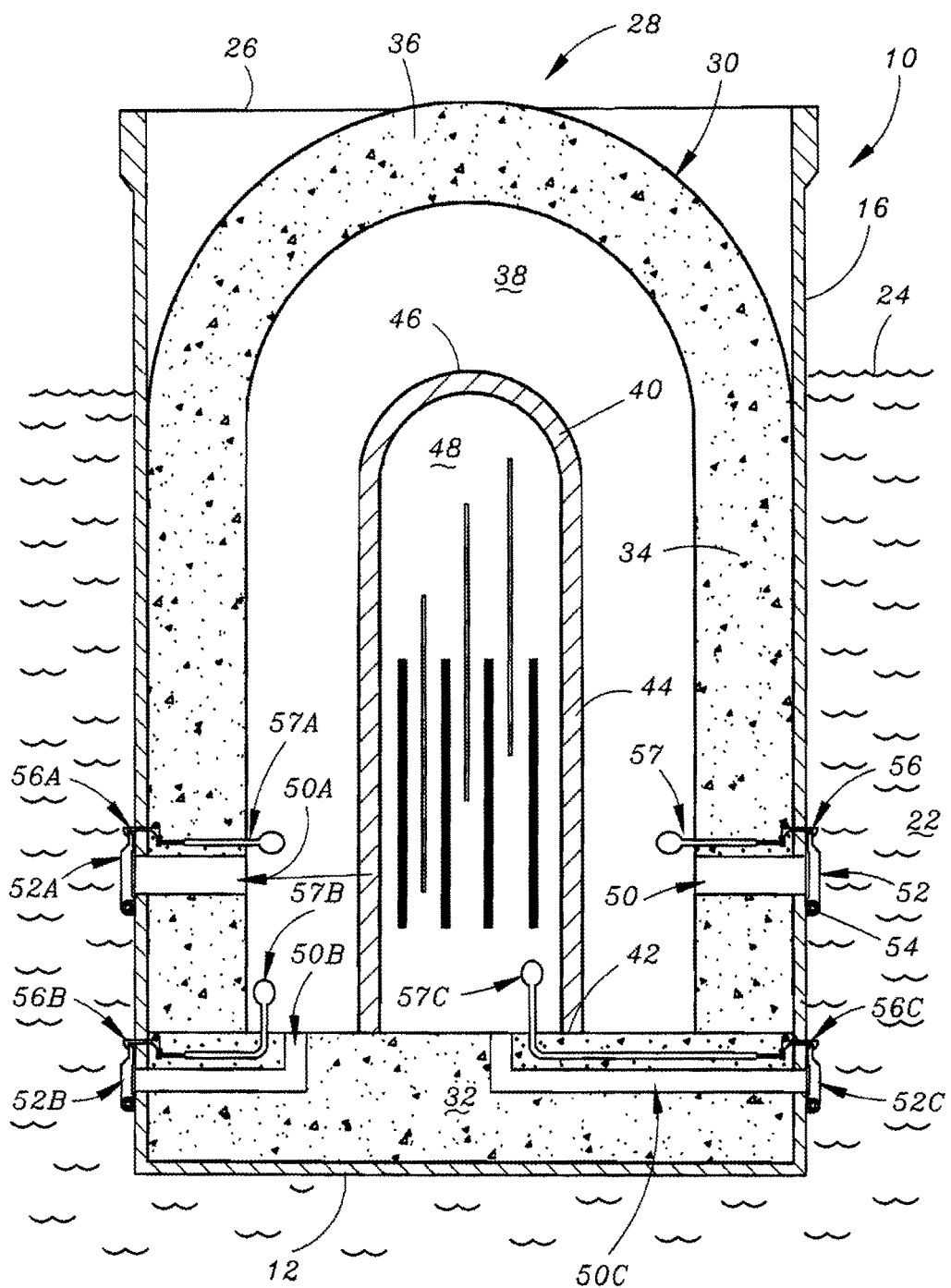
FIG. 3 is a sectional view of one of the nuclear power reactors of FIG. 1.
Figure 5:
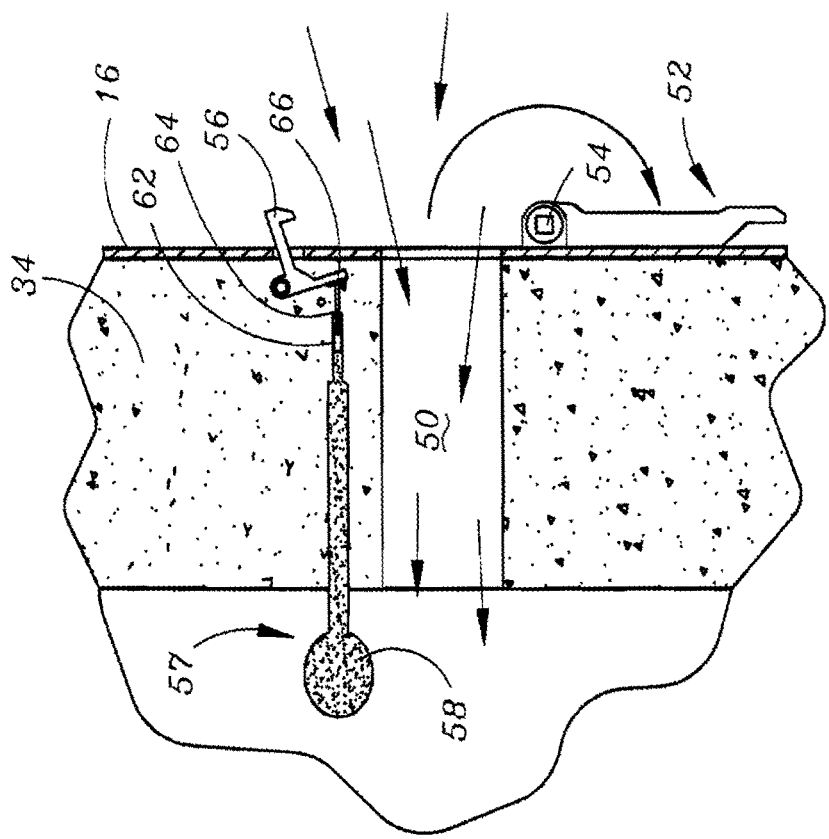
FIG. 5 is a partial sectional view of the structure of FIG. 4 wherein the hatch is in the open position.
Figure 4:
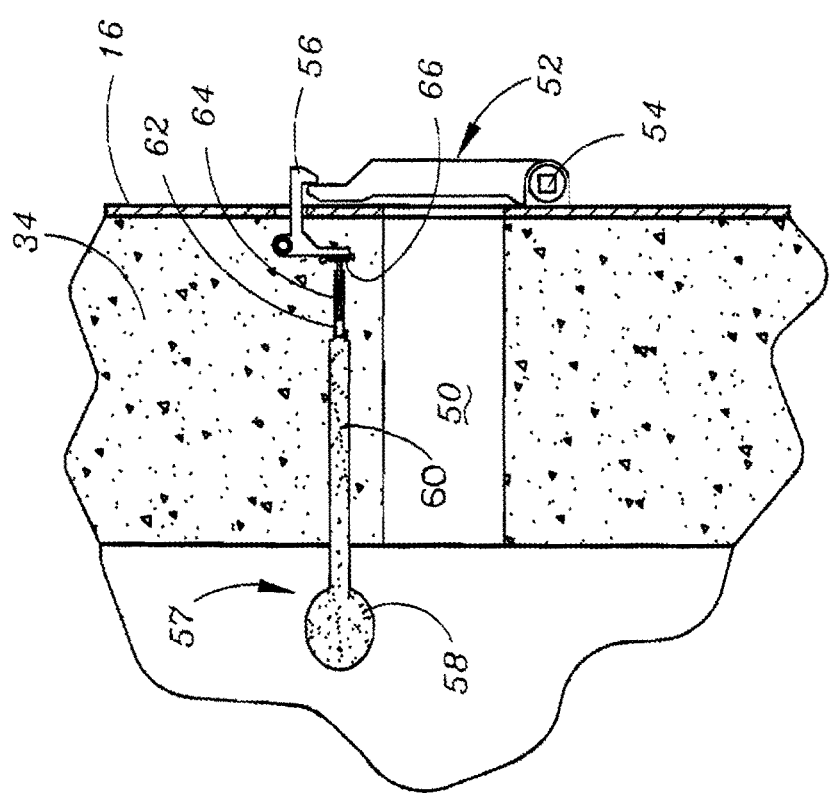
FIG. 4 is a partial sectional view of one of the hatch assemblies of FIG. 3 with the hatch thereof being in a closed position.

In the first embodiment of FIGS. 1-5, the side wall 34 of containment structure 30 and side 16 of barge 10, have a horizontally disposed water passageway 50 formed therein. The lower end of a spring-loaded hatch 52 is pivotally secured to the exterior of side 16 at 54 to close the outer end of water passageway 50. Hatch 52 includes a spring (not shown) which urges hatch 52 to its open position. A pivotal latch 56 maintains hatch 52 in its closed position, as seen in FIG. 4. The numeral 57 refers to a condition actuator which includes a body portion 58 and a neck portion 60 extending therefrom. A piston 62 is slidably mounted in neck portion 60 which has a rod 64 extending therefrom. A plate 66 is secured to the outer end of rod 64. The actuator 57 is positioned in side wall 34 so that the enlarged portion of body portion 58 is located in the interior compartment 38, as seen in FIG. 3. The actuator 57 is responsive to temperature or pressure and is filled with an expanding gas, liquid, or a combination thereof. The actuator 57 could be triggered by an expanding solid rod.

Plate 66 engages latch 56 as seen in the drawings. In normal operating conditions, the piston 62, rod 64 and plate 66 remain in the retracted position of FIG. 4. If the temperature or pressure within compartment 38 should reach a critical pre-set temperature or pressure level, the media within the actuator 57 will be heated or pressurized and will expand to extend the piston 62, rod 64 and plate 66 outwardly thereby engaging latch 56 to move latch 56 to an unlatched position. The movement of the latch 56 to the unlatched position of FIG. 5 causes the spring-loaded hatch 52 to move to its open position of FIG. 5 thereby enabling water to pass inwardly through passageway 50 to flood the compartment 38 thereby cooling the reactor vessel 40 to prevent a meltdown.

An identical passageway 50A may be formed in side wall 34 and side 14 of barge 10, opposite to passageway 50, which is closed by a hatch 52A in an identical manner as just described above. An actuator 57A is associated with latch 56A as also just described.

Water may also be flooded into the lower end of compartment 38 by way of the passageway 50B, actuator 57B, latch 56B and hatch 52B as seen in FIG. 3. The interior of reactor vessel 40 may be flooded by way of the passageway 50C, hatch 52C, latch 56C and actuator 57C, as seen in FIG. 3.

Figure 6:
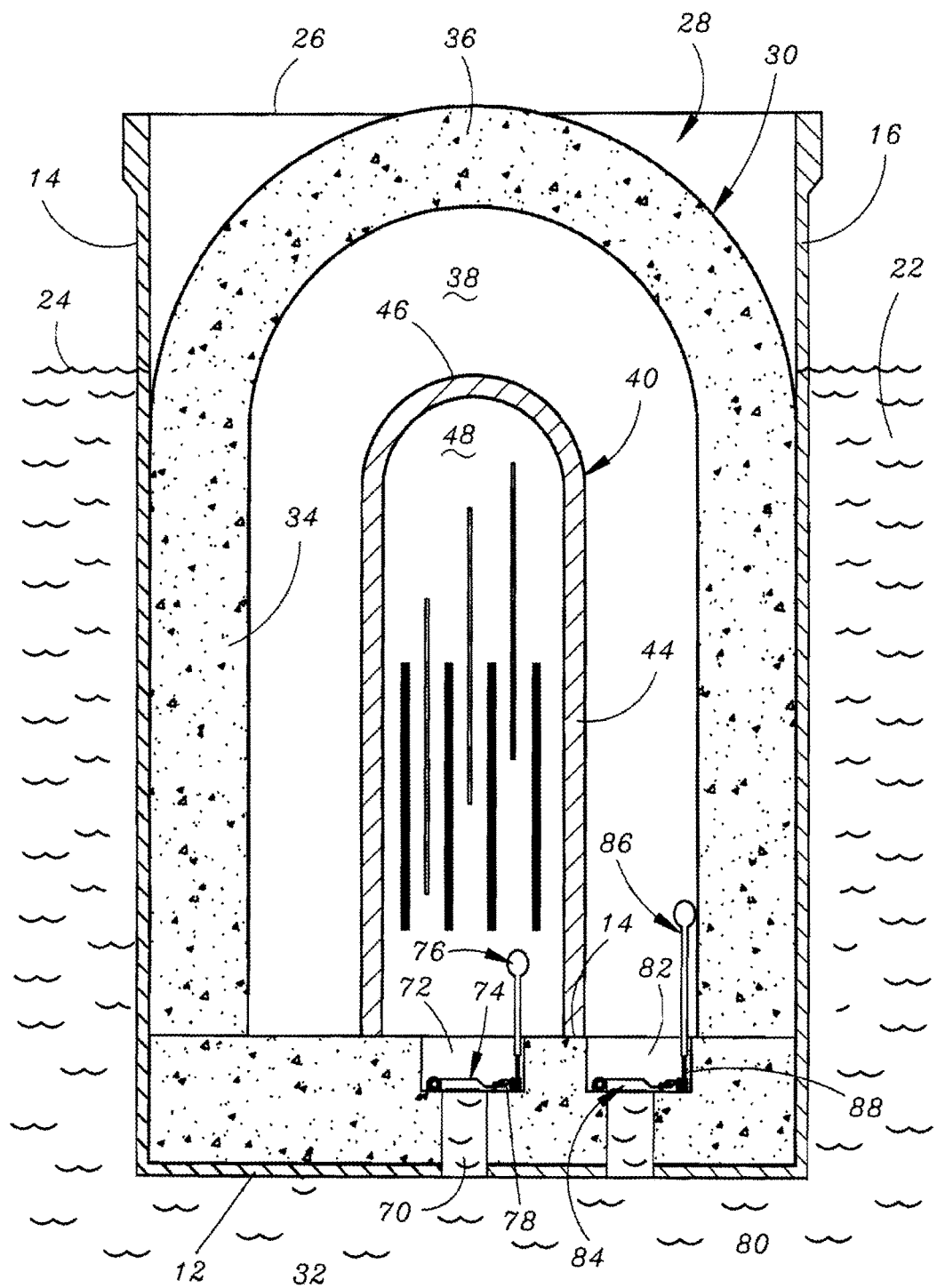
FIG. 6 is a sectional view of a second embodiment of the invention wherein the hatches thereof are in a different location than the embodiment of FIGS. 1-5.

In the second embodiment of FIG. 6, a water passageway 70 extends upwardly through bottom 12 of barge 10 and through bottom 32 of containment structure 30. The inner end of passageway 70 communicates with a larger water passageway 72, which communicates with the interior of reactor vessel 40. A hatch 74, which is identical to hatch 52, is positioned in passageway 72 to normally close passageway 78. A condition responsive actuator 76, which is identical to actuator 57, operates latch 70 which is identical to latch 56. Should the temperature or pressure within reactor vessel 40 rise to a predetermined level, actuator 76 will release the latch 78 so that hatch 74 will open thereby flooding the interior of reactor vessel 46.

In the second embodiment of FIG. 6, a water passageway 80 extends upwardly through bottom 12 of barge 10, and through bottom 32 of containment structure 30. The inner end of passageway 80 communicates with a larger water passageway 82 which communicates with the interior compartment 38. A hatch 84, which is identical to hatch 52, is positioned in passageway 82 to normally close passageway 80. A condition responsive actuator 86, which is identical to actuator 57, operates latch 88 which is identical to latch 56. Should the temperature or pressure within interior compartment 38 rise to a predetermined level, actuator 86 will release the latch 88 so that hatch 84 will open thereby flooding interior compartment 38.

Figure 7:
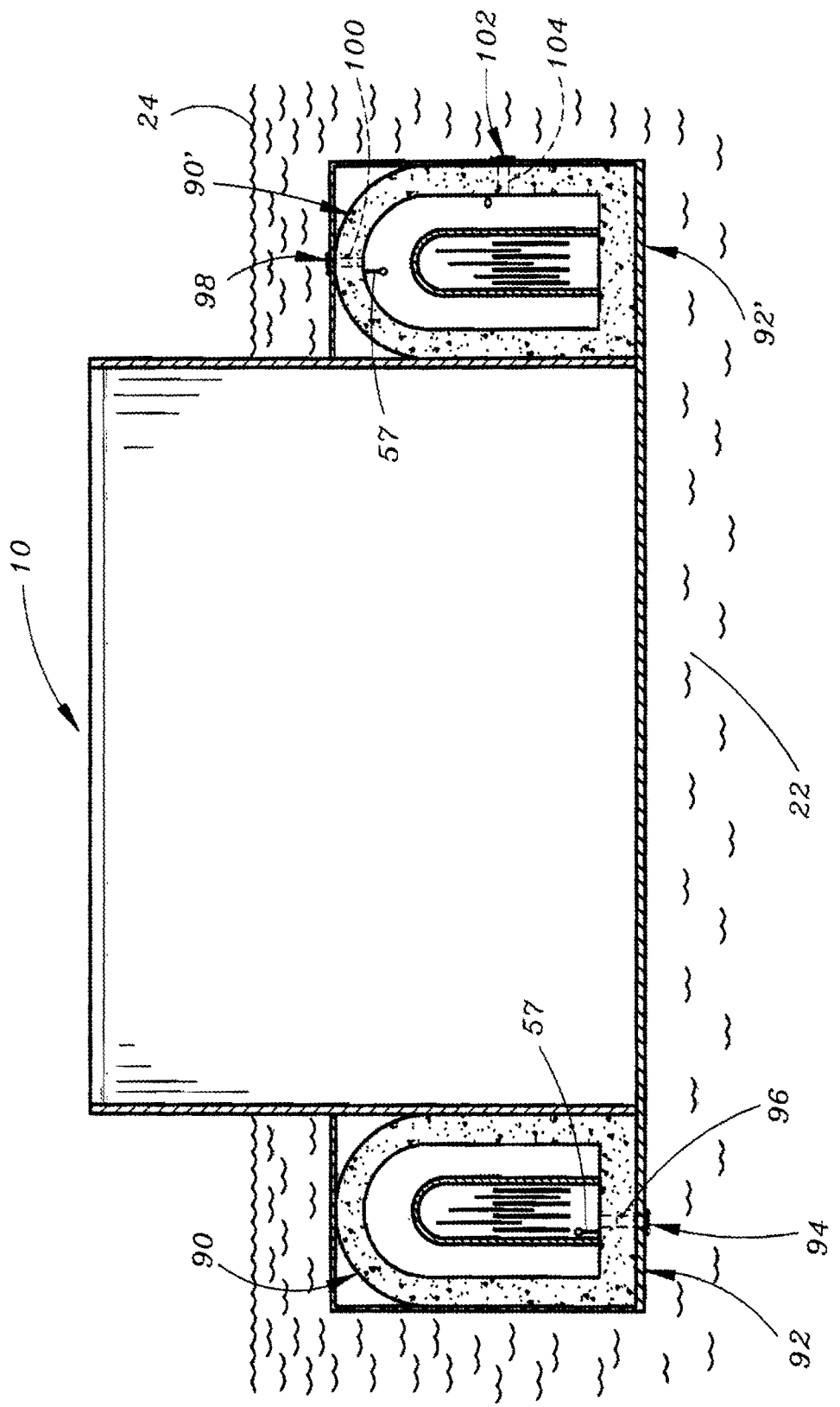
FIG. 7 is a sectional view of a third embodiment of the invention.
Figure 8:
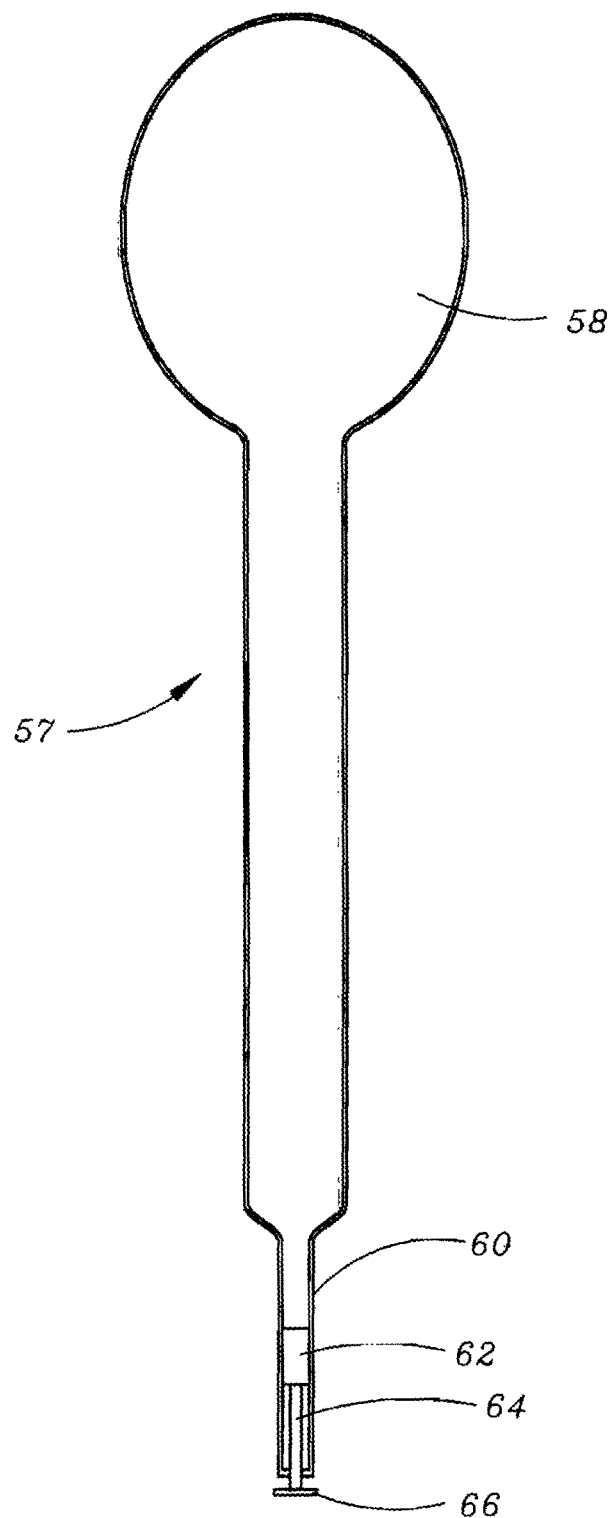
FIG. 8 is a sectional view of one type of actuator.

A third and preferred embodiment of the invention is shown in FIG. 7. In the embodiment of FIG. 7, the nuclear reactor 90 and 90' are submerged in the body of water and are positioned in barge portions or compartments 92 and 92' respectively. In reactor 90, a normally closed hatch 94 is positioned in the floor or bottom of the barge portion 92 to close the outer end of a water passageway 96 which is in communication with the body of water and the interior of the reactor 90. An actuator 57 senses the temperature or pressure within the actuator 90' as discussed hereinabove. Should the temperature or pressure reach a pre-set level within reactor 90, hatch 94 will be opened, as discussed above, to flood the reactor.

In reactor 90', a normally closed hatch 98 is positioned in the upper end of barge portion 92' to close the outer end of a passageway 100 which is in communication with the body of water and the interior of the reactor 90'. An actuator 57 senses the temperature or pressure within the reactor 90' as discussed above. Should the temperature or pressure reach a pre-set level within reactor 90', hatch 98 will be opened, as discussed above, to flood the reactor 90'. Further, a normally closed hatch 102 is positioned in the end of barge portion 92' to close the outer end of a passageway 104 which is in communication with the body of water and the interior of the reactor 90'. An actuator 57 senses the temperature or pressure within the reactor 90' as discussed above. Should the temperature or pressure reach a pre-set level within reactor 90', hatch 102 will be opened, as discussed above, to flood the reactor 90'.

Although the drawings illustrate that the nuclear reactor or reactors are mounted on a floating vessel such as a barge, the nuclear reactor or reactors could be positioned on the floor of a body of water.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A floating nuclear power reactor, comprising:
   a floating vessel having a bottom positioned beneath the water level of a body of water, sides extending upwardly from said bottom, and an upper end which is positioned above the water level of the body of water;
   a nuclear power reactor supported on said vessel;
   at least a portion of said nuclear power reactor being submerged in the body of water;
   said nuclear power reactor having a lower end, an upstanding side wall, and an upper end;
   a water passageway, having inner and outer ends, extending through said floating vessel and into said nuclear power reactor;
   a normally closed hatch movably associated with said water passageway;
   said hatch being movable between a normally closed position and an open position;
   said hatch, when in said closed position, closing said water passageway;
   said hatch, when in said open position, permitting water from the body of water to flow inwardly through said water passageway into said nuclear power reactor;
   a latch associated with said hatch which is movable from a latched position to an unlatched position;
   said latch, when in said latched position, maintaining said hatch in said closed position;
   said latch, when in said unlatched position, permitting said hatch to move from said closed position to said open position;
   and a condition responsive actuator positioned within said nuclear power reactor which causes said latch to move from said latched position to said unlatched position upon a condition within said nuclear power reactor reaching a predetermined level.

2. The floating nuclear power reactor of claim 1 wherein said condition responsive actuator is a temperature condition responsive actuator.

3. The floating nuclear power reactor of claim 1 wherein said condition responsive actuator is a pressure condition responsive actuator.

4. The floating nuclear power reactor of claim 1 wherein said water passageway extends into the lower end of said nuclear power reactor.

5. The floating nuclear power reactor of claim 1 wherein said water passageway extends through the upstanding side wall of said nuclear power reactor.

6. The floating nuclear power reactor of claim 1 wherein said water passageway extends into the upper end of the nuclear power reactor.

7. The floating nuclear power reactor of claim 6 wherein a second water passageway extends from the body of water through the upstanding side wall of the nuclear power reactor.

8. The floating nuclear power reactor of claim 7 wherein a third water passageway extends from the body of water into the lower end of the nuclear power reactor.

* * * * *